United States Patent [19]

Parker

[11] 3,764,731

[45] Oct. 9, 1973

[54] COLOR SIGNAL RECORDING AND DECODING APPARATUS

[75] Inventor: Norman W. Parker, Wheaton, Ill.

[73] Assignee: Motorola, Inc., Franklin Park, Ill.

[22] Filed: Feb. 14, 1972

[21] Appl. No.: 226,100

[52] U.S. Cl....... 178/5.2 D, 178/5.4 CD, 178/6.7 A, 179/15 AW, 325/142, 325/143, 178/DIG. 28

[51] Int. Cl.......... H03k 9/10, H04j 9/00, H04n 9/32

[58] Field of Search.................... 178/5.4 CD, 5.2 D, 178/5.2 R, 6.7 A; 179/15 AW; 325/142, 143

[56] References Cited

UNITED STATES PATENTS

| | | | |
|---|---|---|---|
| 3,644,677 | 2/1972 | Cecchin | 178/6.7 A |
| 3,622,693 | 11/1971 | Ciello | 179/15 AW |

*Primary Examiner*—Howard W. Britton
*Attorney*—Vincent Rauner et al.

[57] ABSTRACT

Apparatus for converting two independent functions of color saturation and hue into pulses varying in width and frequency each in accordance with one of said functions. Apparatus for scanning a record medium having two level information recorded thereon, said scanning apparatus producing a train of pulses in accordance with the information, which pulses vary independently in width and frequency, each variation representing an independent function of hue and saturation. Circuitry connected to said apparatus for processing the pulses to separate the width variations from the frequency variations and produce two electrical signals representative of the two functions of hue and saturation.

12 Claims, 4 Drawing Figures

COLOR SIGNAL RECORDING AND DECODING APPARATUS

BACKGROUND OF THE INVENTION

1. FIELD OF THE INVENTION

This invention relates to the recording and decoding of color images on a record medium, such as monochromatic film. Recording color pictures on a record medium, such as monochromatic film, is especially useful in conjunction with television, wherein programs can be recorded by an individual or for commercial sales and the recorded programs can be played through a television receiver at the individual's convenience. Recording color pictures on a record medium and decoding said record medium at some convenient later time is also useful in areas such as education and teaching.

2. DESCRIPTION OF THE PRIOR ART

In prior art recording and decoding apparatus it is common to provide a record or film with the image luminance or video (black and white photo) of the subject in a first area and the color information in a second area, generally adjacent the first area. The color information may consist of a series of opaque and transparent lines, which are adapted to be scanned transverse to the longitudinal dimensions thereof and which provide a series of electrical pulses when scanned by the scanner of a decoding unit. In structures such as that described in the co-pending application entitled "Color Signal Recording and Decoding", Ser. No. 8,947, filed Feb. 5, 1970 and assigned to the same assignee, abandoned and now continuation application Ser. No. 210,098, filed Dec. 20, 1971, alternate electrical pulses produced by scanning the opaque and transparent lines in the film represent the amplitude of one independent function of hue and saturation, such as Q or R-Y, and the interspersed pulses represent a second independent function of hue and saturation, such as I or B-Y. In such prior art systems it is necessary to utilize synchronizing signals to separate the pulses representative of the two independent functions. Further, because each pulse only represents one function of the color and both functions are necessary to properly identify the color, the number of pulses is greatly exaggerated. To squeeze sufficient information into the space available relatively high repetition rates must be utilized and somewhat lower bandwidths.

SUMMARY OF THE INVENTION

The present invention pertains to recording and decoding apparatus utilizing a record medium wherein image luminance or video are recorded on a first portion thereof and two independent functions of hue and saturation are recorded on a second portion thereof in two level recordings (such as transparent and opaque). The two level recordings being representative of electrical pulses variable in width and in frequency, the width varying in accordance with one of the independent functions and the frequency varying in accordance with the other independent function.

It is an object of the present invention to provide improved recording and decoding apparatus for color pictures.

It is a further object of the present invention to provide an improved record medium wherein color information, in the form of two independent functions of hue and saturation represented by electrical pulses varying in width and in frequency, is recorded by two level recordings.

It is a further object of the present invention to provide decoding apparatus adapted to receive electrical pulses varying in width and in frequency in accordance with two independent functions of hue and saturation, which apparatus provides electrical signals, in response to said pulses, varying in amplitude as the amplitude variations of the independent functions and adapted to be applied to a display device.

It is a further object of the present invention to provide improved recording and decoding apparatus and recording medium for more efficiently recording a greater amount of information in a substantially similar area of recording medium as the prior art.

These and other objects of this invention will become apparent to those skilled in the art upon consideration of the accompanying specification, claims and drawings.

BRIEF DESCRIPTION OF THE DRAWINGS

Referring to the drawings.

DESCRIPTION OF THE PREFERRED EMBODIMENT

Figure 1:
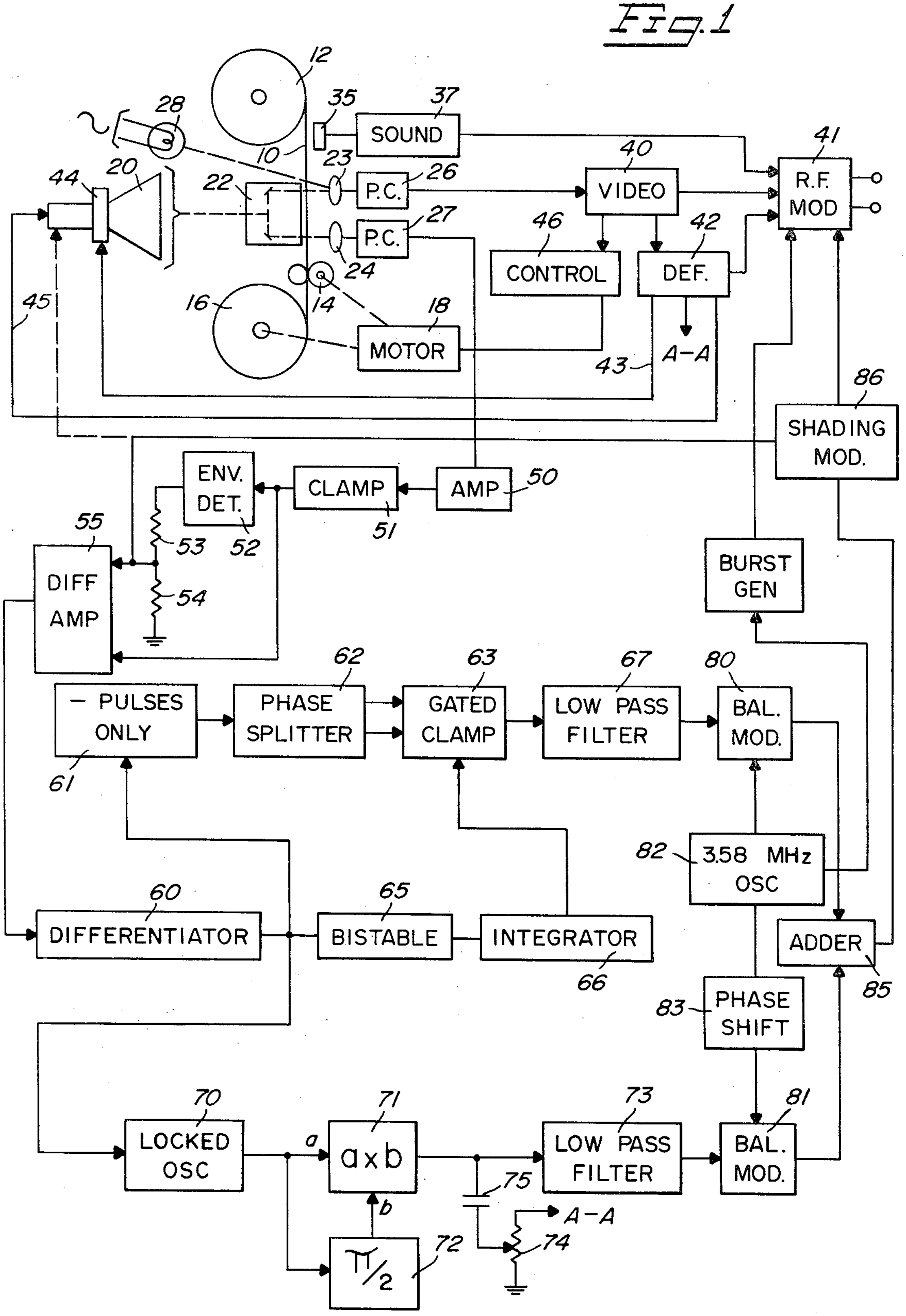
FIG. 1 is a block diagram of an embodiment of apparatus for deriving image luminance or video signals and color coded signals from a record medium.

The apparatus of FIG. 1 functions to derive, from a record medium, signals representing video or image luminance information, color information in the form of two independent functions of hue and saturation and signals representing accompanying sound. The luminance, color and sound information signals are shown as applied to a modulator to form a multiplex modulated carrier signal which is tunable on one channel of a standard television receiver. Alternatively, of course, the video and sound signals may be directly applied to a cathode ray image reproducer and an audio frequency reproducing system for direct reproduction of the recorded information without going through the intervening processes of modulating and demodulating as occurs in the usual television transmission system. It will also be apparent upon consideration of the following description that the record medium could take forms other than the photographic film described in detail, and that a record medium such as magnetic tape or an embossed strip could also be successfully operative within many aspects of the system.

In FIG. 1a film 10 is drawn from a supply reel 12 by a capstan 14 and wound on a takeup reel 16. A motor 18 drives the capstan 14 and the takeup reel 16 at the desired rate. A raster generated by a cathode ray tube 20 is projected through an optical image splitter 22 so that the same raster image is projected through each of two portions 30 and 32 of the film 10. Associated lenses 23 and 24 focus the raster images on a pair of photo cells 26 and 27, respectively. The photo cell 26 provides a signal representing the video or luminance information of the portion 30 of film 10 and the photo cell 27 provides a signal corresponding to variations in the opaqueness of the portion 32 of film 10. A light bulb 28 is energized to provide illumination which can be optically conducted to a region through which synchronizing windows 29 of film 10 pass in order to periodically generate a signal in the photo cell 26 representing frame scanning information. A magnetic pickup head 35 scans sound tracks 36 on the film 10 and is coupled to sound circuitry 37 to develop audio signals.

Figure 2:
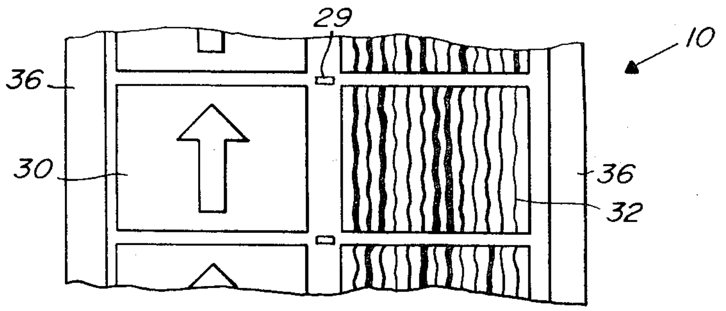
FIG. 2 is a representation of a segment of photographic film having image luminance or video and color information recorded in accordance with the invention.

FIG. 2 illustrates a segment of the photographic film 10 which includes the image luminance portion 30 of a frame and the color coded portion 32 of a frame in side by side relation along the length of the film 10. Sound tracks 36 extend along opposite edges of the film for magnetic recording of stereophonic sound information, or for providing two different sets of sound information alternately usable with the images. In the central area of the film 10 between the portions 30 and 32, the synchronizing windows 29 are positioned, which windows 29 may be, for example, clear areas of the film in an otherwise opaque region so that frame scanning of the image areas can be synchronized. It should be understood that the representation of the film scanning apparatus of FIG. 1 is illustrated, so that all of the components will appear in the diagram, as longitudinally displaced whereas actually the scanning apparatus should be laterally positioned for scanning of the side by side portions 30 and 32 of each frame of the film of FIG. 2.

The image luminance portions 30 of the film 10 are illustrated as simply the image of an arrow. These frames may be in the form of a series of black and white transparencies with the series depicting various stages of motion as is common in motion picture photography. The image modulates the light from the raster of the tube 20 to produce a series of horizontal scanning cycles of video information which is translated from the photo cell 26 to a video amplifier 40. This video information may be in a frequency range of 0 to 3 or more megacycles as is common in television. The signal is then translated to an RF modulator 41 for modulation of a suitable carrier wave to be developed at the output terminals thereof for application to the tuner of a television receiver.

A portion of the output information of video amplifier 40 will also include vertical scanning pulses from the light of bulb 28 passing through the synchronizing windows 29. Such pulses are coupled to a deflection system 42, which provides horizontal and vertical sweep signals by way of a lead 43 to a deflection yoke 44 on the cathode ray tube 20. The system would, of course, operate to scan a new one of the luminance portions 30 in response to each pulse produced by sync window 29 (at a 60 cycle rate) and the scanning of each frame could take place, in accordance with usual television practice, at a horizontal deflection rate of 15.734 MHz. The deflection system 42 provides a blanking pulse during horizontal retrace over a lead 45 which is applied to the cathode-grid circuit of the tube 20 for blanking the raster during retrace. It is also appropriate to couple sweep control signals from the deflection circuit 42 to the modulator 41 so that suitable vertical and horizontal deflection control pulses may be incorporated in the output of the modulator 41.

It is necessary, in this embodiment, to control the speed of the motor 18 so that the film 10 is driven past the scanning apparatus in synchronism with vertical scanning in picture tube 20. Accordingly, a control circuit 46 is coupled to the video amplifier 40 to be responsive to signals developed by the synchronizing windows 29. The control circuit 46 is coupled to the motor 18 to alter the rate of drive of the film 10 so that the start of vertical scanning takes place at the beginning of each frame.

It should be recognized that the system described thus far is operative to produce at the output of the RF modulator 41, a monochrome television signal including sound information, image luminance information, and horizontal and vertical sweep control signals which may be coupled to the input of a receiver for processing in a known way to produce a black and white image together with appropriate sound. Attention will now be directed to the decoding and recording of the color information represented in the portion 22 of each frame on film 10.

The color coded portion 32 of each frame includes opaque and transparent stripes positioned to be scanned by the raster of tube 20 generally transverse to the longitudinal direction of the stripes. Each transition from transparent to opaque to transparent, or the reverse if desired and recorded in that sequence, represents an electrical pulse. The width of the electrical pulses varies in accordance with a first independent function of hue and saturation, such as Q, R-Y, etc. The frequency or repetition rate of the electrical pulses varies in accordance with a second independent function of hue and saturation, such as I, B-Y, etc. When the color coded portion 22 of the film 10 modulates the image of the raster on the face of the tube 20 as it is projected on photo cell 27, the photo cell output will comprise a signal, or train of pulses, varying in response to the transparent and opaque stripes, or two level recordings, of the portion 32. The signal is applied to an amplifier 50, the output of which is applied to a clamping circuit 51. Because of variations in light conduction of the scanning system, a finite width of the scanning spot and variations in decoding and recording electronics and equipment, the amplitude and configuration of the color representative signal available at the output of the amplifier 50 may vary. Because, in the present embodiment, it is desirable to produce pulses which are substantially square waves and because the pulses applied to amplifier 50 are asymmetrical, it is necessary to provide several operations on the pulses to render them as nearly square as possible without losing or altering any of the information (width and frequency) contained therein.

Figure 3:
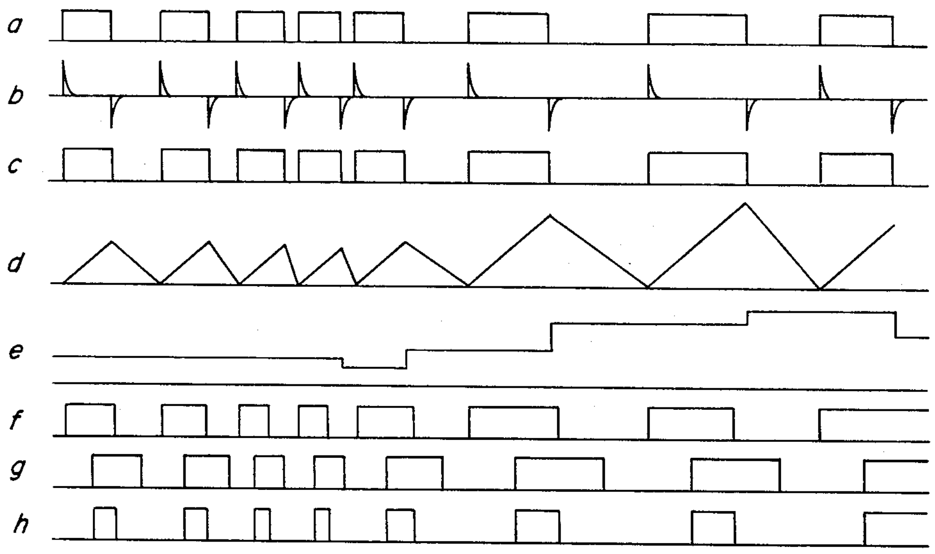
FIG. 3 is a series of amplitude versus time waveforms approximately as they appear at various points in the apparatus of FIG. 1.

The circuit 51 clamps one set of peaks of the output wave from amplifier 50 to a fixed level. The clamped color representative signal is applied to an envelope detector 52, which develops an output across voltage dividing resistors 53 and 54 that varies with the peak level of the output wave, the envelope being represented by the positive peaks of the signal applied by clamp 51. Resistors 53 and 54 are of equal value so that one half of the envelope amplitude is developed across resistor 54 and applied to a differential amplifier 55. The output of the clamp circuit 51 is also applied to a second input of the differential amplifier 55 so that the amplifier 55 effectively operates upon the output wave and one half of the amplitude of the envelope of the output wave, which amounts to providing a central axis for the wave. On the average, the amplitude variations of the signal translated in the differential amplifier 55 vary equally in the positive and negative direction about a restored axis. Amplifier 55 has a further characteristic of amplitude limiting or clipping the wave which it translates so that the output thereof, waveform A in FIG. 3, is a clipped form of the color representative signal or wave having fixed amplitudes about a central axis. The width and frequency of the pulses of waveform A, however, correspond with the width and frequency of the pulses applied to amplifier 50 and thus correspond with the width and frequency between record level changes in the portion 32 of film 10.

The output of the differential amplifier 55 is applied to a differentiator 60, which differentiates the pulses of waveform A to produce the positive and negative spikes illustrated in waveform B. A circuit indicated by block 61 is utilized to pass only the negative spikes of the output of differentiator 60 to a phase splitter circuit 62. Phase splitter circuit 62 produces signals, which are 180° out of phase, on two output lines connected to two inputs of a gated clamp 63.

The output of the differentiator 60 is also applied to a bistable circuit 65, which provides an output as illustrated in waveform C. The primary purpose of the bistable circuit 65 is to provide pulses having the same width as the pulses supplied by the differential amplifier 55 and further having a constant amplitude. While a bistable circuit 65 is illustrated in the present apparatus, it should be understood that substantially any circuit which can provide output pulses of the desired width having a constant amplitude may be utilized. The output of the bistable circuit 65, waveform C in FIG. 3, is applied to an integrator circuit 66, which produces the sawtooth output illustrated in waveform D of FIG. 3. Because the pulses applied to the integrator 66 have a constant amplitude and are substantially square, the sawtooth output of the integrator 66 has a substantially constant slope and the amplitude of each of the sawtooth signals (waveform D) is proportional to the width of the pulse (waveform C) from which the sawtooth is derived. The output of the integrator 66 is applied to an input of the gated clamp 63.

A variety of gated clamping circuits are well known to those skilled in the art and any of these circuits which perform the functions desired may be utilized. The gated clamp 63 is the type of circuit which responds to the positive and negative input pulses from the phase splitter 62 and the sawtooth input from the integrator 66 to provide an output having an amplitude proportional to the peaks of the sawtooth and, which output is maintained at that amplitude until a sawtooth is applied which has a different amplitude. Waveform E of FIG. 3 depicts the output of the gated clamp circuit 63. The output of the gated clamp circuit 63 is applied to a low pass filter 67 which integrates the signal to produce a continuous signal varying in amplitude in accordance with one of the independent functions of hue and saturation.

The output of the differentiator 60 is also applied to an input of a locked oscillator 70 and serves to synchronize or lock the oscillator 70 onto the frequency of the pulses applied to the differentiator 60. The locked oscillator 70 may include a clipping icrcuit or may be a type of oscillator which produces a generally square pulse so that the output thereof appears as illustrated in waveform F of FIG. 3. These output pulses are applied to the input of a multiplying or comparing circuit 71 and to the input of a phase shifting circuit 72. The output of the phase shifting circuit 72 is applied to a second input of the circuit 71. The phase shifting circuit 72 may be any convenient circuit, such as a tuned circuit or delay line, which will shift the signal 90° at a central frequency, in this embodiment approximately 1.5 MHz. The locked oscillator 70 has a center or normal operating frequency of 1.5 MHz and varies approximately 0.5 MHz in either direction in response to locking signals from the differentiator 60. The amount of phase shift of the circuit 72 varies as the frequency of the signals applied thereto varies about the center frequency. A typical output signal from the phase shifting circuit 72 is illustrated in waveform G of FIG. 3. The circuit 71 is similar to a gate or coincidence circuit which operates to provide an output during the time that there are pulses present on both inputs thereof. The combination of the circuits 71 and 72 operates similar to an FM discriminator or a quadrature detector and either of these circuits might be utilized, if desired, since the signals applied from the locked oscillator 70 are frequency modulated signals.

The output signal of the circuit 71 appears as a series of pulses (waveform H in FIG. 4) that vary in width in accordance with the coincidence of the two signals (waveforms F and G) applied to the circuit 71. Since the phase shift produced by the circuit 72 varies with frequency, the amount of coincidence between the two signals applied to the circuit 71 varies with frequency. The output signal from the circuit 71 is applied to a low pass filter 73 which averages or smoothes the signal to provide a continuous signal varying in amplitude in accordance with the second independent function of hue and saturation. The horizontal deflection signal from the deflection circuit 42 is applied through a potentiometer 74 and capacitor 75 to the input of the low pass filter 73. The horizontal deflection signal combined with the output signal of the circuit 71 adds a slight bias to the output signal to compensate for velocity errors due to nonlinearities in the horizontal sweep or scan of the film 10.

The signal from the low pass filter 67 is applied to a balanced modulator 80 and the signal from the low pass filter 73 is applied to a second balanced modulator 81. Modulator 80 is also responsive to a signal from an oscillator 82 which has the frequency of the color subcarrier standard in color television practice (approximately 3.58 MHz). The signal from oscillator 82 is also phase shifted by approximately 90° in a phase shift circuit 83 and applied to the modulator 81. The outputs of the modulators 80 and 81 are applied to an adder circuit 85 and through a shading modulator circuit 86 to the RF modulator 41 to be incorporated with the television signal generated thereby as a quadrature modulated subcarrier carrying the multiplex information of two color different signals which will be reproducible by the usual color television receiver.

Figure 4:
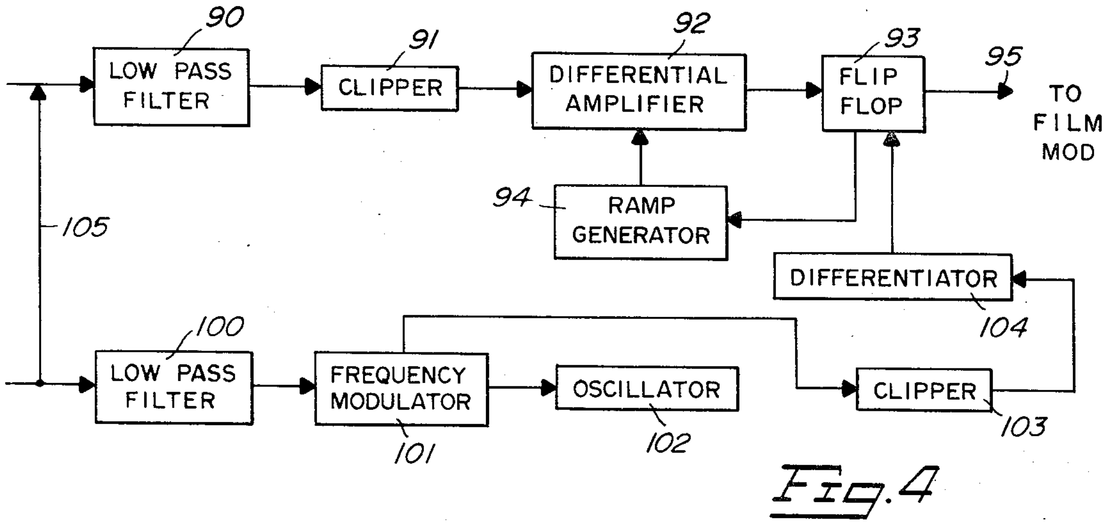
FIG. 4 is a block diagram of an embodiment of a portion of apparatus for recording color information on a record medium.

FIG. 4 illustrates a block diagram of apparatus for converting two independent functions of hue and saturation into pulses varying in width in accordance with one of said independent functions and varying in frequency in accordance with the other of said independent functions. A first electrical signal varying in amplitude in accordance with the first of said independent functions is applied to the input of a low pass filter 90, which reduces the noise and limits the bandwidth of the signal. The output of the filter 90 is applied to a clipper circuit 91, which limits the amplitude of the signal to a certain predetermined magnitude so that pulses, produced in circuitry to be explained presently, will not overlap or run together. The output of the clipper 91 is applied to one input of a differential amplifier 92. The output of the differential amplifier 92 is applied to one input of a bistable circuit 93 and one output thereof is applied to a ramp generator 94. The output of the bistable circuit 93 applied to the ramp generator 94 is a generally square pulse which is operated on, for example by integration, to provide a ramp for each pulse, having a constant slope, which ramps are applied to a second input of the differential amplifier 92. The output of the differential amplifier 92 is a series of trigger signals or pulses varying in relative time of occurrence in accordance with the varying amplitude of the signal from the clipper 91. The trigger signal or pulses from the differential amplifier 92 are utilized in the bistable circuit 93 to determine the width of pulses appearing at an output 95 thereof.

An electrical signal varying in amplitude in accordance with the second independent function of hue and saturation is applied to a low pass filter 100, which reduces the noise and limits the bandwith of the signal. The output of the low pass filter 100 is applied to one input of a frequency modulator 101, a second input of which is received from an oscillator 102. In this embodiment the oscillator 102 is operating at a frequency of approximately 1.5 MHz and the output of the frequency modulator 101 is a series of pulses varying about the frequency 1.5 MHz in accordance with the amplitude of the signal applied from the filter 100. The output signal of the modulator 101 is applied to a clipper 103 which limits the amplitude and provids substantially square pulses at the output thereof. The square pulses from the clipper 103 are applied to a differentiator 104 and trigger pulses, in this embodiment the positive spikes, from the differentiator 104 are applied to the bistable circuit 93. The trigger pulses or positive spikes from the differentiator 104 start the action of the bistable circuit 93 and determine the position of the leading edge of pulses appearing at the output 95, which determines the frequency or repetition rate of the output pulses.

It is imperative that the variations in pulse width and the variations in frequency or repetition rate are independent and do not produce interaction or crosstalk, since this crosstalk will greatly effect the color of the transmitted pictures. Several methods and types of apparatus may be utilized to reduce or eliminate such crosstalk, only one of which is illustrated in FIG. 4. In FIG. 4 a predetermined amount, with a proper phase relationship, of the signal applied to the filter 100 is also applied, by way of a line 105, to the filter 90 to aid in maintaining a constant ratio of pulse width to a complete cycle during variations in frequency or repetition rate. In this fashion the pulse width is rendered substantially independent of variations in frequency. With the exemplary frequencies and values of variations specified in this embodiment, it has been found that application to the filter 90 of approximately 0.677 of the signal applied to the filter 100 will maintain the duty cycle of the pulses relatively independent of frequency. Changes in values, frequencies and/or circuits may require different amounts of signal applications between inputs.

Thus, a train of pulses is provided at the output 95 of the bistable circuit 93, which pulses vary in width in accordance with a first independent function of hue and saturation and vary in frequency in accordance with a second independent function of hue and saturation. These pulses are applied to a film modulator (not shown) to produce the opaque and transparent lines in the portion 32 of the film 10 (see FIG. 2). It should be understood, of course, that many other types of circuits might be utilized to provide pulses which vary in width in accordance with a first signal, such as an independent function of the hue and saturation for color information, and vary in frequency in accordance with a second signal, such as a second independent function of hue and saturation for color information.

Thus, apparatus has been disclosed for converting two independent signals to pulses varying in width and frequency and a recording medium having these pulses recorded thereon is also disclosed. In addition, apparatus has been disclosed for decoding the information on the recording medium to reproduce pulses varying in width and in frequency and to separate the two variations to produce a signal representative of the pulse width variation and a signal representative of the pulse frequency or repetition rate variation, and operating on the signals to render them usable in a television receiver or other display device. Because the two variations are independent and distinguishable, it is not necessary to supply synchronizing signals or the like. Further, the signals require less area of the recording medium.

While I have shown and described a specific embodiment of this invention, further modifications and improvements will occur to those skilled in the art. I desire it to be understood, therefore, that this invention is not limited to the specific form shown and I intend in the appended claims to cover all modifications which do not depart from the spirit and scope of this invention.

I claim:

1. Apparatus for decoding recorded color picture information including two level recordings representative of two independent functions of hue and saturation, said apparatus comprising:

a. transducer means for scanning the two level recordings and providing a series of electrical pulses varying in width and in frequency in accordance with the two independent functions of hue and saturation;

b. means coupled to said transducer means and responsive to the variations in pulse width for providing a first electrical signal varying in amplitude in accordance with one of said two independent functions of hue and saturation; and c. means coupled to said transducer means and responsive to the variations in pulse frequency for providing a second signal varying in amplitude in accordance with the other of said two independent functions of hue and saturation.

2. Apparatus as set forth in claim 1 including in addition oscillator means providing a carrier signal and means connected to said oscillator means and further connected to receive the first and second signals for providing carrier signals modulated by said first and second signals.

3. Apparatus as set forth in claim 1 having in addition differentiating means coupled between the transducer means, the means responsive to the variations in pulse width and the means responsive to the variations in pulse frequency, said differentiating means providing a series of positive and negative spikes in response to square pulses applied thereto with one of said negative and positive spikes varying in relative position in accordance with variations in pulse width and the other of said negative and positive spikes varying in relative position in accordance with variations in pulse frequency.

4. Apparatus as set forth in claim 3 wherein the means responsive to variations in pulse width include sawtooth generating means providing sawtooth signals having a substantially constant slope, gate means connected to receive said sawtooth signals and responsive to the one of said negative and positive spikes varying in relative position in accordance with variations in pulse width, and integrating means connected to receive output signals from said gate means and providing a signal varying in amplitude in accordance with one of the two independent functions of hue and saturation.

5. Apparatus as set forth in claim 3 wherein the means responsive to variations in pulse frequency include locked oscillator means responsive to the other of said negative and positive spikes varying in relative position in accordance with variations in pulse frequency, phase shifting means connected to an output of said oscillator means, and providing a signal shifted in phase an amount dependent upon the frequency of the signal from said oscillator means, gate means connected to receive the signal provided by said phase shifting means and responsive to the output of said oscillator means, and integrating means connected to receive output signals from said gate means and providing a signal varying in amplitude in accordance with one of the two independent functions of hue and saturation.

6. Encoding apparatus for recording color picture information comprising:

a. first and second means each adapted to receive an electrical signal representative of a separate independent function of hue and saturation and each providing a signal varying in amplitude in accordance with the respective independent function applied thereto;

b. first trigger means connected to receive the signal from the first means and providing trigger pulses varying in repetition in accordance with the amplitude of the signal applied thereto;

c. second trigger means connected to receive the signal from the second means and providing trigger pulses varying in frequency in accordance with the amplitude of the signal applied thereto; and d. bistable means coupled to said first and second trigger means and providing a train of output pulses varying in width in accordance with one of the independent functions of hue and saturation and varying in frequency in accordance with the other of the independent functions in hue and saturation.

7. Encoding apparatus as set forth in claim 6 wherein the first and second means include integrating circuits.

8. Encoding apparatus as set forth in claim 6 wherein the first trigger means includes a differential amplifier connected to receive the signal from the first means and responsive to a constant slope ramp from a ramp generating means, said ramp generating means being connected to receive signals from the bistable means and produce ramps in response to the signals therefrom.

9. Encoding apparatus as set forth in claim 6 wherein the second trigger means includes frequency modulating circuitry connected to receive an output signal from an oscillating means and responsive to the signal from the second means to provide a signal varying in frequency in accordance with the other of the independent functions of hue and saturation, means for producing a substantially square wave connected to receive the signal from the frequency modulating circuitry, and differentiating means connected to receive the square wave and provide trigger pulses varying in frequency in accordance with the other of the independent functions.

10. Apparatus for decoding color picture information including pulses varying in width and frequency in accordance with two independent functions of hue and saturation, said apparatus comprising:

a. transition detecting means adapted to receive the pulses and provide signals corresponding with transitions of the pulses between levels;

b. first means coupled to said transition detecting means and responsive to the signals therefrom for providing a first electrical signal varying in amplitude in accordance with one of the two independent functions of hue and saturation; and c. second means coupled to said transition detecting means and responsive to the signals therefrom for providing a second electrical signal varying in amplitude in accordance with the other of the two independent functions of hue and saturation.

11. Apparatus as set forth in claim 10 wherein the transition detecting means includes differentiating means.

12. Apparatus as set forth in claim 10 wherein the first means are responsive to a portion of the signals from the transition detecting means representative of pulse width information and the second means are responsive to a portion of the signals from the transition detecting means representative of pulse frequency information.

* * * * *